Patented Sept. 22, 1925.

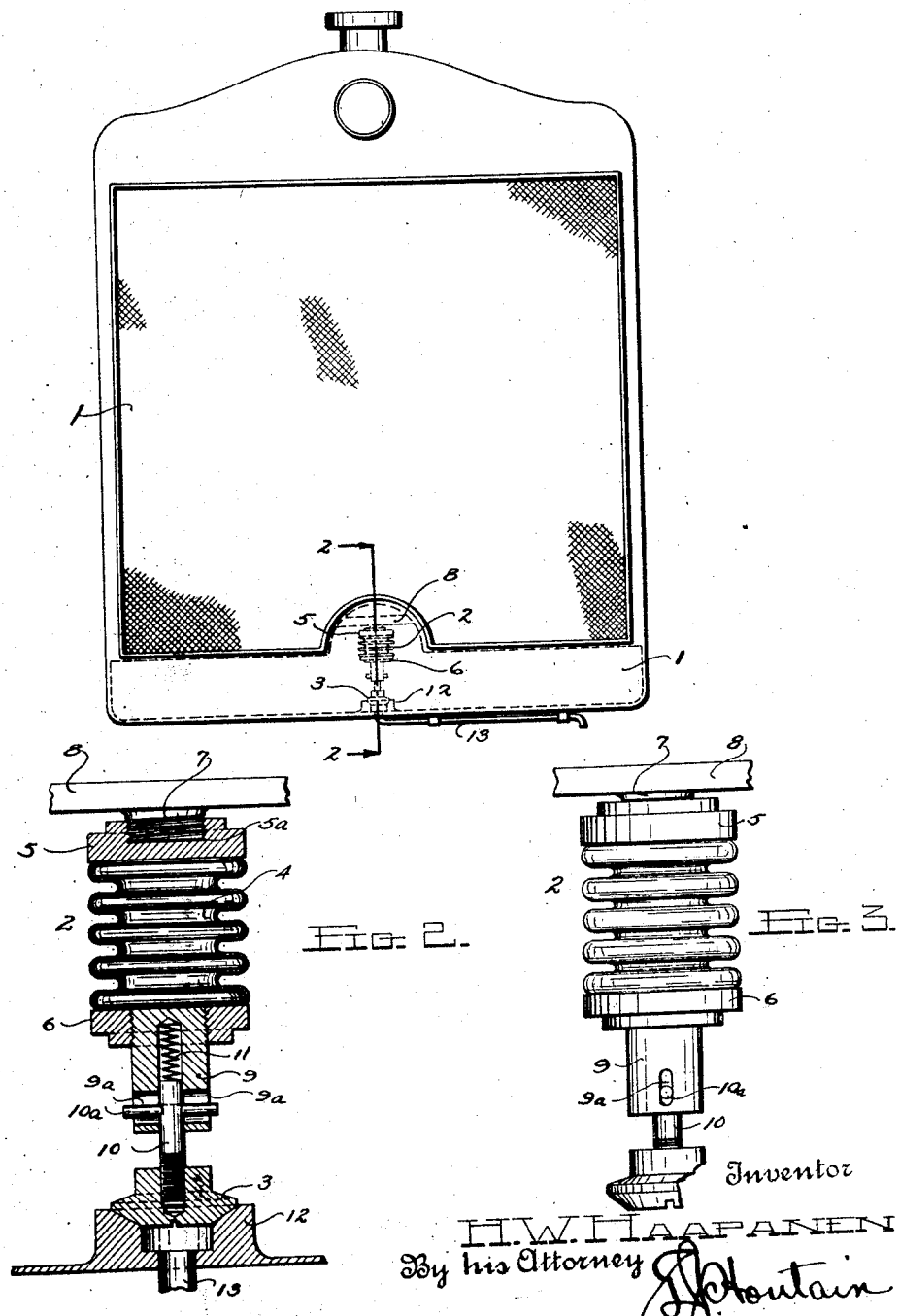

1,554,344

UNITED STATES PATENT OFFICE.

HENRY WALDEMAR HAAPANEN, OF ST. LOUIS, MISSOURI.

CONTROLLING DEVICE.

Application filed June 20, 1921. Serial No. 479,078.

*To all whom it may concern:*

Be it known that I, HENRY W. HAAPANEN, a citizen of the United States, and resident of St. Louis, in the county of St. Louis and State of Missouri, have invented certain new and useful Improvements in Controlling Devices, of which the following is a specification.

This invention relates to controllers, having reference more particularly to a device for controlling the temperature of liquids.

The invention has for its principal object the provision of means for preventing the water from freezing in circulating systems, as the circulating system of an automobile engine, and also the circulating water systems of dwelling houses or other buildings; a further object being to provide a simple, inexpensive and durable device of this character which is automatic in its operation.

In carrying out my invention, I provide a thermostat, a spring actuated normally closed and adjustable valve adapted to be operated by said thermostat, and means for exhausting water when a predetermined low degree of temperature is reached, as hereinafter fully described and specifically set forth in the appended claims.

In the accompanying drawings forming part of this specification, Figure 1 is a front view of an automobile radiator illustrating one embodiment of my improvements;

Fig. 2 is a vertical sectional view of a detail of the invention, drawn on an enlarged scale and taken on the line 2—2 of Fig. 1; and Fig. 3 is a side elevation of said detail.

In the drawings 1 indicates an automobile radiator having my improvement introduced in the lower part of its water circulating system; said improvement essentially consisting of a thermostat 2 and a normally closed valve 3, adapted to be opened by said thermostat when the liquid in the circulating system is subjected to a temperature at or below the freezing point. The thermostat 2 comprises an expansible and contractible chamber 4, composed of thin sheet metal and of an accordeon-like form, said chamber containing an expansible and contractible fluid, as alcohol.

The ends of the chamber 4 are closed by means of heads 5 and 6; the head 5 having a threaded socket 5ª, for engaging a screw-stud 7, of a suitable supporting member 8, and the head 6 having a hollow cylindrical extension 9, which is closed at its inner end and open at its outer end. Extended into the cylindrical extension 9 is a reciprocating rod or stem 10 having a screw-threaded outer end for adjustable engagement with the valve 3. The cylindrical extension 9 is provided with oppositely located slots 9ª through which is extended a lateral pin 10ª, which is fixed to the stem 10, and which acts to limit the relative movement between the member 9 and stem 10. Located between the inner end of the stem 10 and the closed head of the cylindrical extension 9 is a spring 11, having a normal tendency to force said stem outwardly, whereby the valve 3 is maintained normally seated.

The seat for the valve 3 is formed within a hollow member 12 forming part of the circulating system and which has an exhaust tube 13 leading therefrom, for exhausting liquid when the valve 3 is opened.

The above described device embodies a fair example of my improvement as adapted for operative correlation with the water circulating system of an automobile, but I do not confine myself to the specific details of mere mechanical form and construction of the elements, neither do I confine myself to the application of my improvement to the circulating system of an automobile, as I may apply my invention to the exposed parts of the house supply water circulating systems of buildings without departing from the spirit of my invention and the scope of the appended claims.

In the operation of the invention, when the water in the circulating system is maintained at a comparatively high temperature, the thermostat 2 remains normally expanded to maintain the valve 3 closed and when no water can escape. When the temperature of the water in the circulating system, is lowered to or below the freezing point the thermostat contracts until the member 9 moves inwardly to an extent sufficient to unseat the valve 3, whereby the water may escape through the tube 13, thus obviating liability of having it freeze within the circulating system.

Having thus described my invention, what I claim as new and desire to secure by Letters Patent, is:

1. In combination with a liquid circulating system having an outlet, an expansible and contractible thermostat of accordeon construction, said thermostat having a spring pressed valve stem reciprocal relative thereto and means for limiting the movement of said stem relative to the thermostat, a valve adjustably fixed to said stem, and a valve seat surrounding said outlet, together with means for conducting liquid from said outlet when the valve is opened by contraction of said thermostat.

2. In combination with a liquid circulating system having an outlet, an expansible and contractible thermostat of accordeon construction, said thermostat having a spring pressed valve stem reciprocal relative thereto, a valve adjustably fixed to said stem, a valve seat surrounding said outlet and means whereby the contraction of the thermostat will open the said outlet.

Signed at St. Louis in the county of St. Louis and State of Missouri this 30th day of April A. D. 1921.

HENRY WALDEMAR HAAPANEN.